United States Patent [19]

Kremidas

[11] Patent Number: 5,317,921
[45] Date of Patent: Jun. 7, 1994

[54] RESISTIVE STRAIN GAUGE PRESSURE SENSOR

[75] Inventor: James R. Kremidas, Fenton, Mich.

[73] Assignee: MacLean Fogg Company, Mundelein, Ill.

[21] Appl. No.: 879,181

[22] Filed: May 5, 1992

[51] Int. Cl.$^5$ .......................... G01L 9/06; G01L 13/02
[52] U.S. Cl. .......................... 73/721; 73/727; 338/4; 338/42
[58] Field of Search ............. 73/721, 727, 720, 726, 73/724, 723, 717, 718; 338/4, 42

[56] References Cited

U.S. PATENT DOCUMENTS

| | | | |
|---|---|---|---|
| 3,505,634 | 4/1970 | Von Vick | 338/4 |
| 3,748,571 | 7/1973 | Kurtz | 323/74 |
| 3,772,628 | 11/1973 | Underwood et al. | 338/4 |
| 4,116,075 | 9/1978 | Ort | 73/708 |
| 4,196,382 | 4/1980 | Bryzek | 73/726 |
| 4,295,376 | 10/1981 | Bell | 73/724 |
| 4,311,980 | 1/1982 | Prudenziati | 338/4 |
| 4,498,070 | 2/1985 | Lirman | 338/42 |
| 4,520,339 | 5/1985 | Utsunomiya | 338/5 |
| 4,658,651 | 4/1987 | Le | 73/727 |
| 4,702,113 | 10/1987 | Warenham | 73/706 |
| 4,770,045 | 9/1988 | Nakagawa et al. | 73/726 |
| 4,974,596 | 12/1990 | Frank | 128/672 |
| 5,014,415 | 5/1991 | Okada | 29/621.1 |
| 5,050,035 | 9/1991 | Hegner et al. | 73/718 |

OTHER PUBLICATIONS

Pp. 425-438, "Measuring Systems Application and Design" Ernest Doebelim, 3rd Ed. McGraw Hill.
Pp. 422-436, "Measuring Systems Application and Design" Ernest Doebelim, 3rd Ed. McGraw Hill.
Atsugi Unisia Corporation Brochure, "Pressure Sensor".
IBM Technical Disclosure Bulletin, "Thick-Film Resonant Device", H. P. Hayden, vol. 9 No. 11, Apr. 1967, p. 1651.
"Measuring Devices", Sec. 6-4, p. 428.
"Resistor Materials, Processing, and Controls", Chapter 6, Gilbert C. Waite, Information Systems Dept. Honeywell, Inc,.

Primary Examiner—Donald O. Woodiel
Attorney, Agent, or Firm—Krass & Young

[57] ABSTRACT

A resistive strain gauge sensor of the type including a circuit board carrying circuitry, a diaphragm bonded to the circuit board, and strain gauge circuitry on the diaphragm. The strain gauge circuitry includes a plurality of leads defining free ends and the circuitry on the circuit board defines a plurality of leads defining free ends. The diaphragm is bonded to the circuit board by a frit layer and the frit layer includes voids which are in respective alignment with the free ends of the strain gauge leads and the free ends of the circuit board leads. A conductive epoxy is positioned in the voids in the frit layer to establish electrical communication between the strain gauge circuitry leads and the circuit board leads without the use of solder joints.

8 Claims, 12 Drawing Sheets

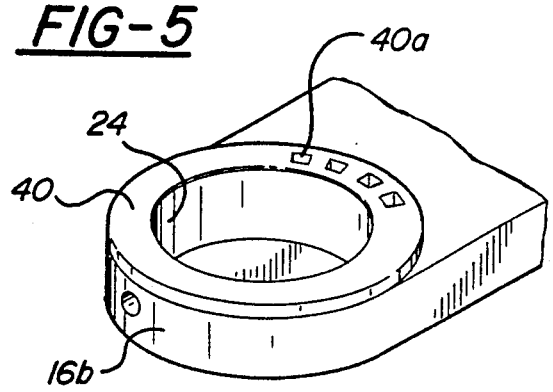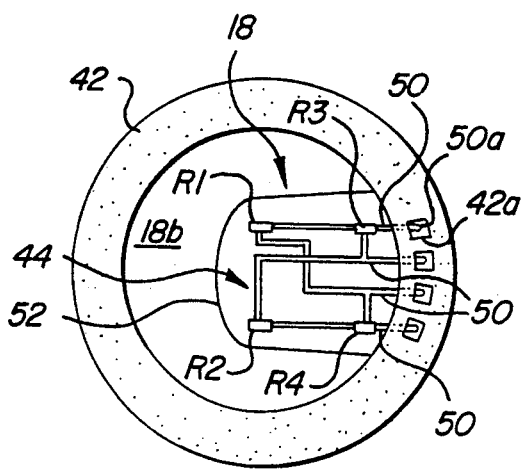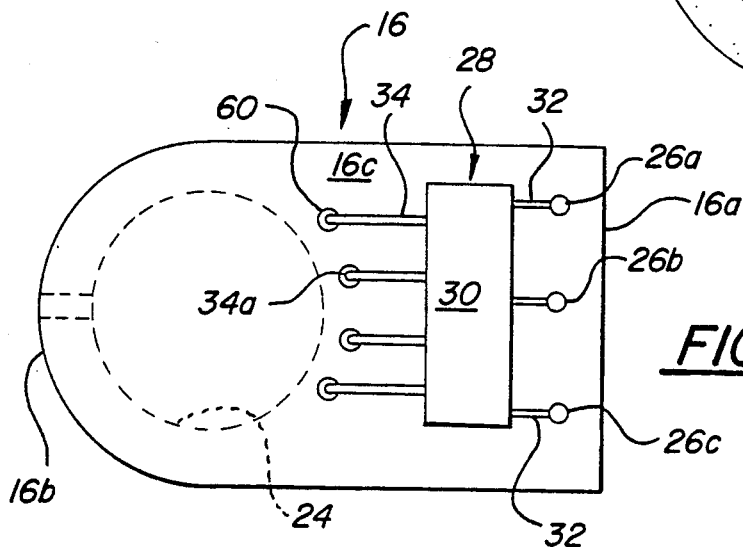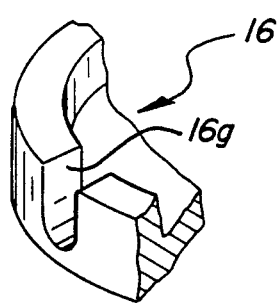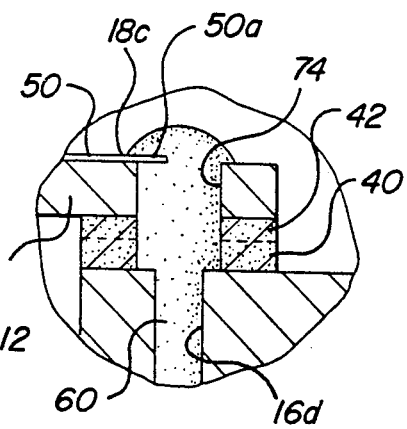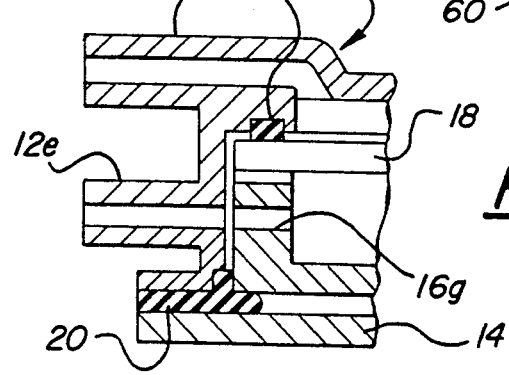

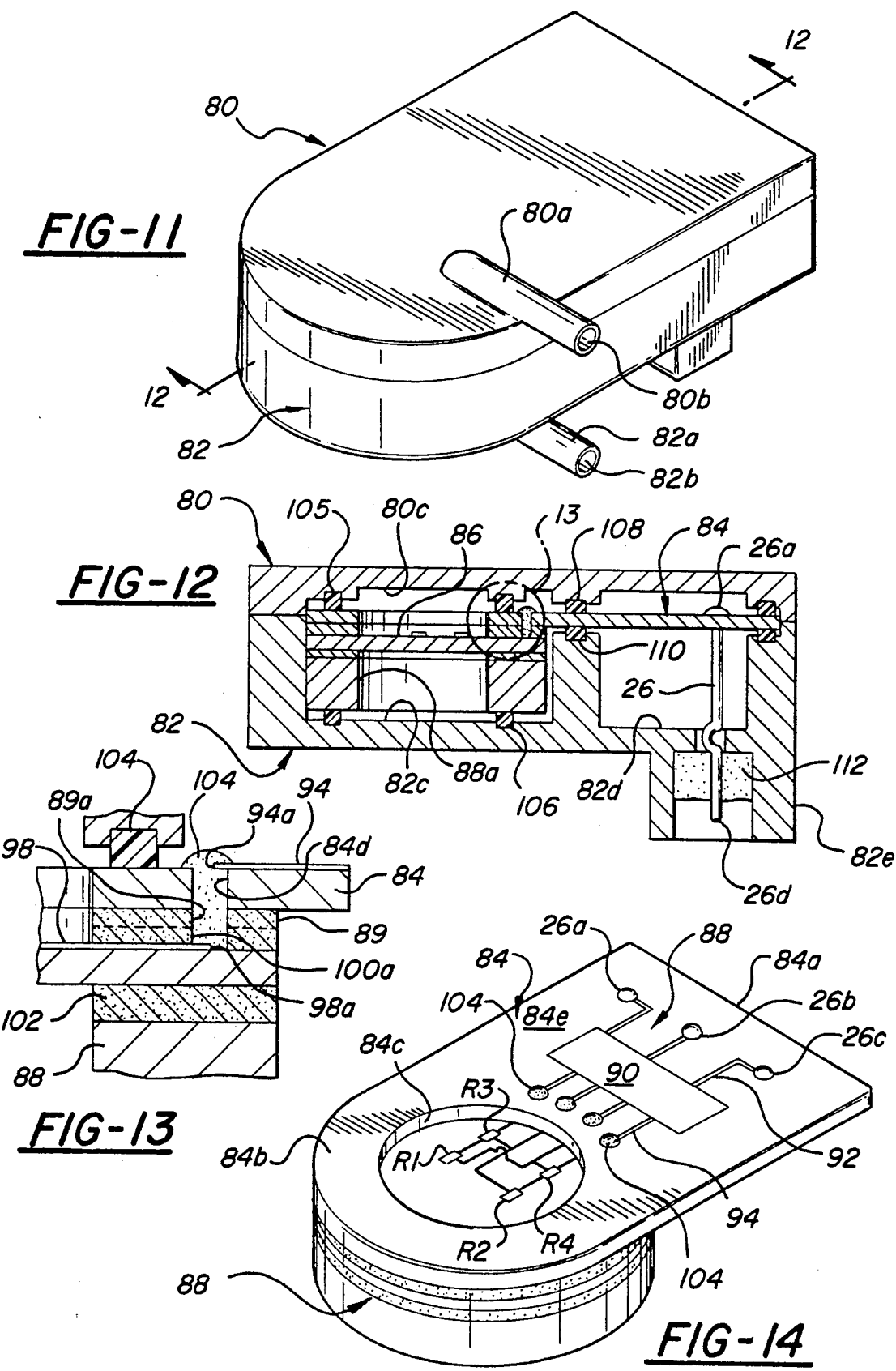

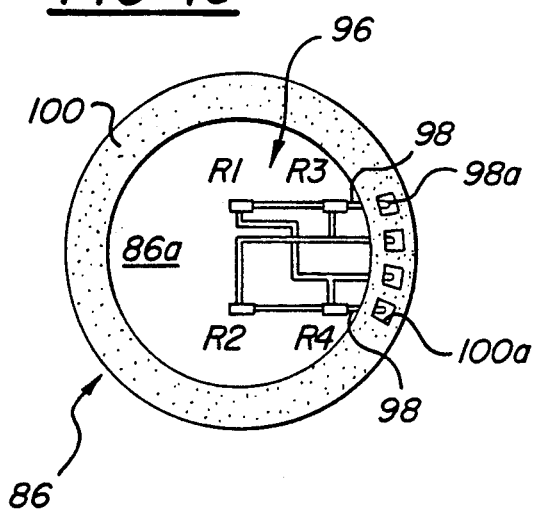
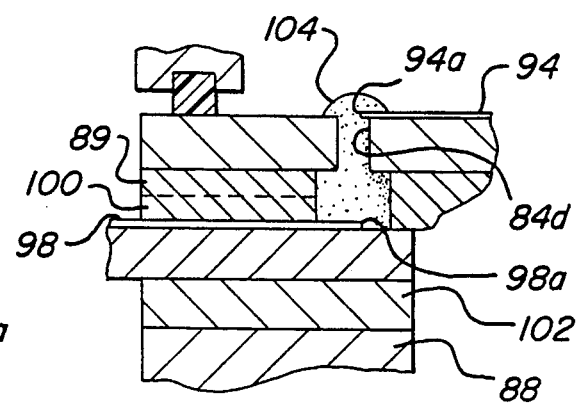
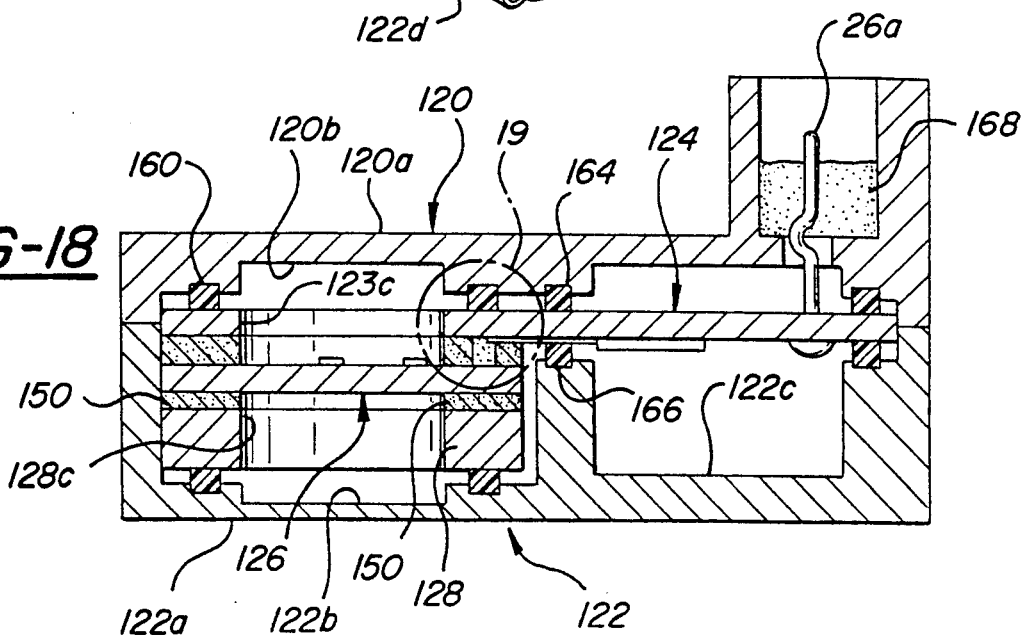

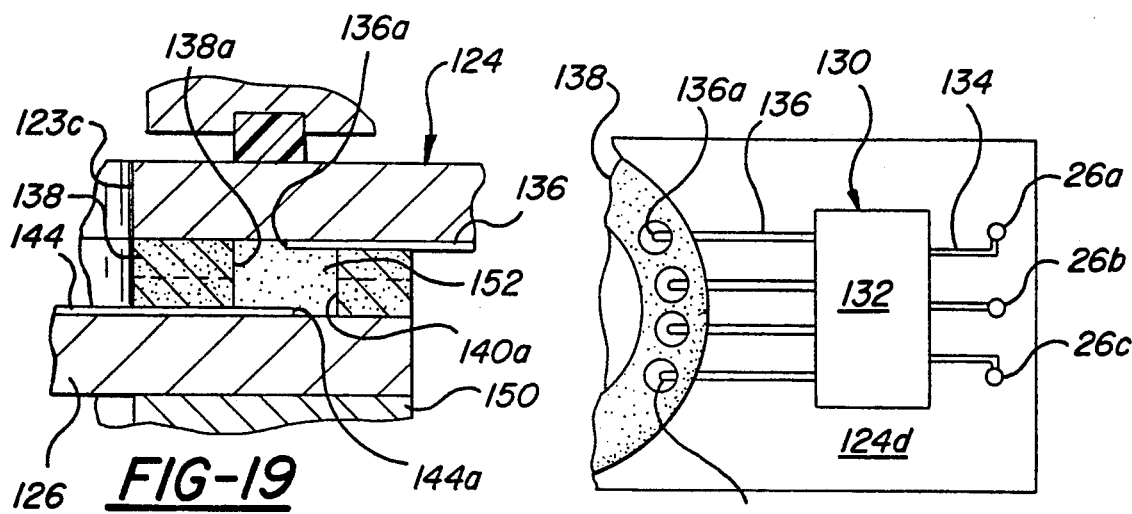
FIG-19
FIG-21
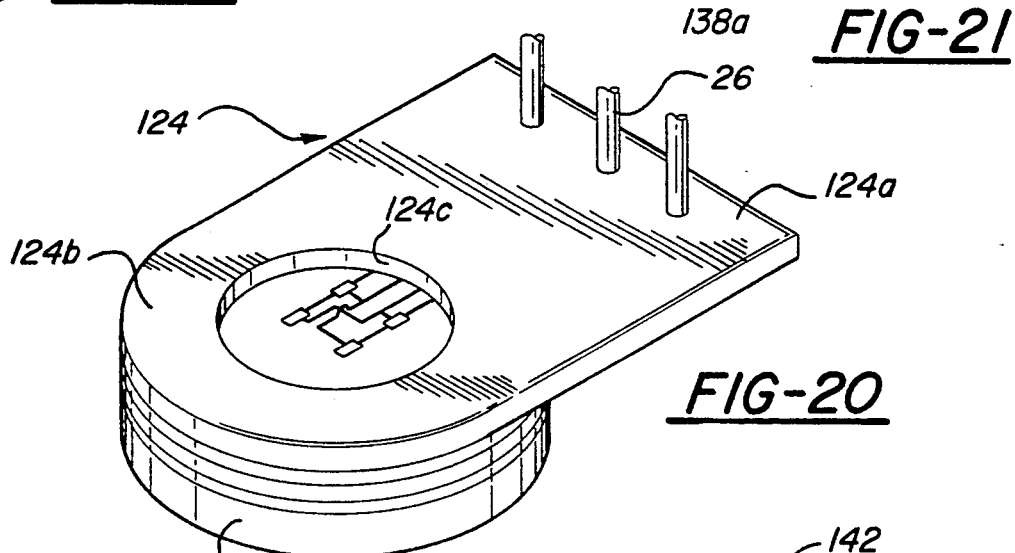
FIG-20
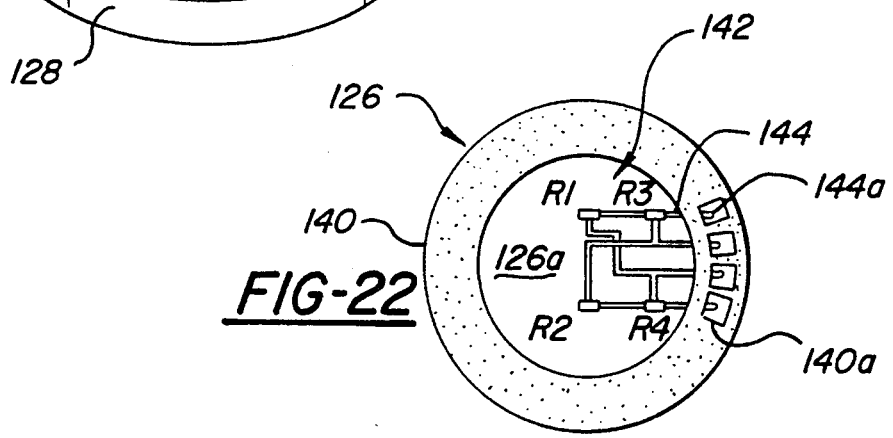
FIG-22
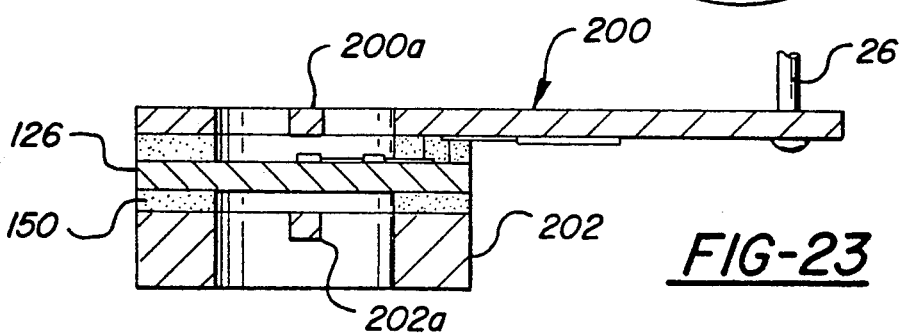
FIG-23

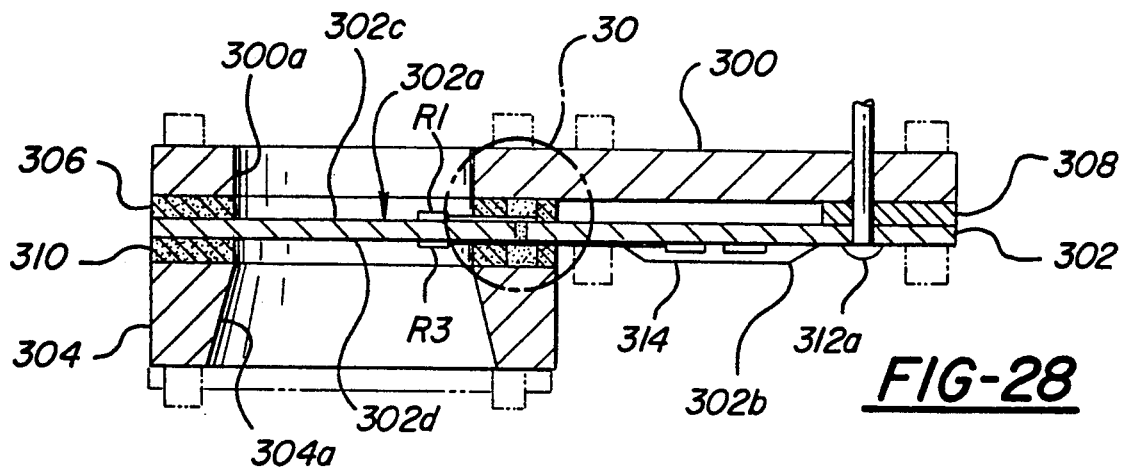
FIG-28
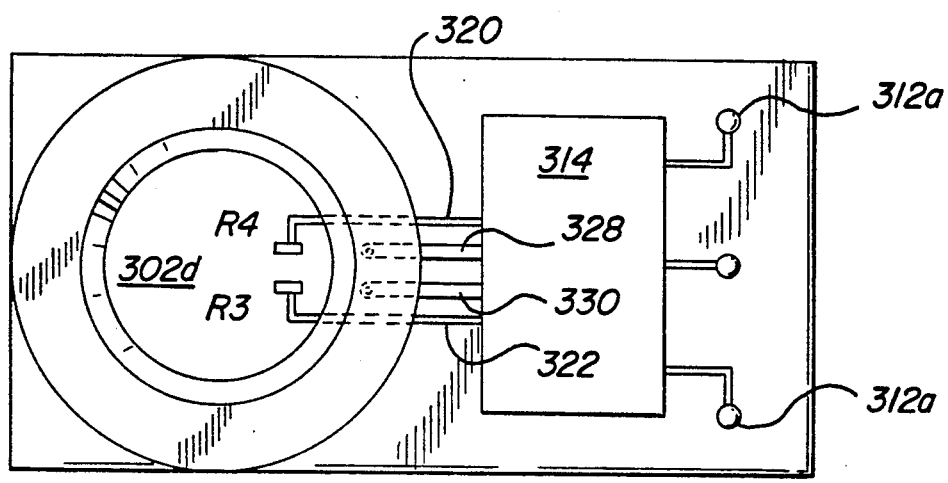
FIG-29
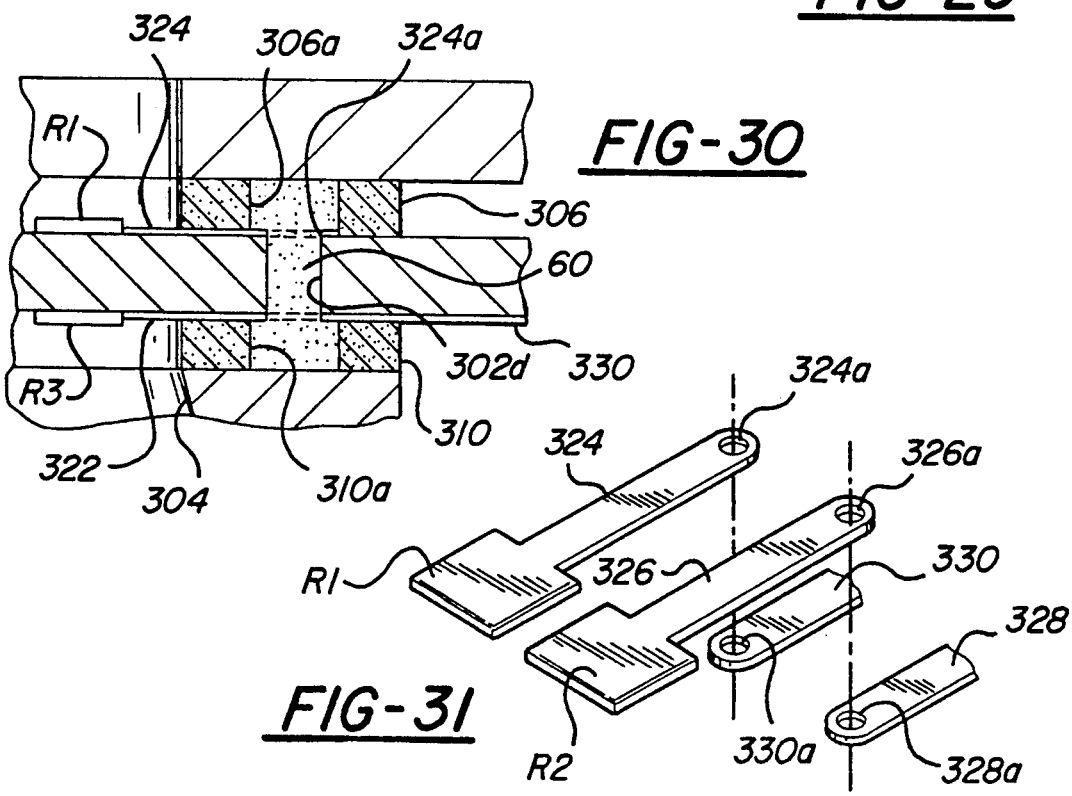
FIG-30
FIG-31

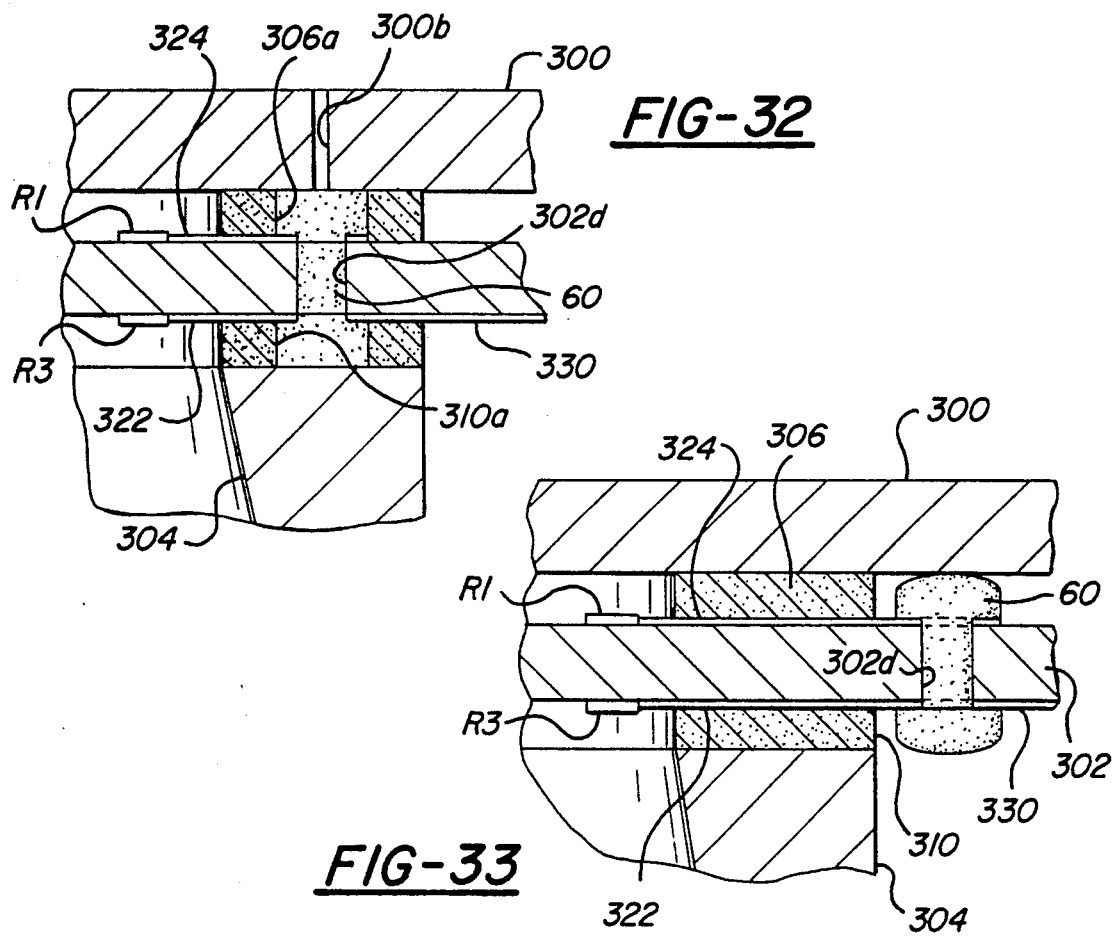
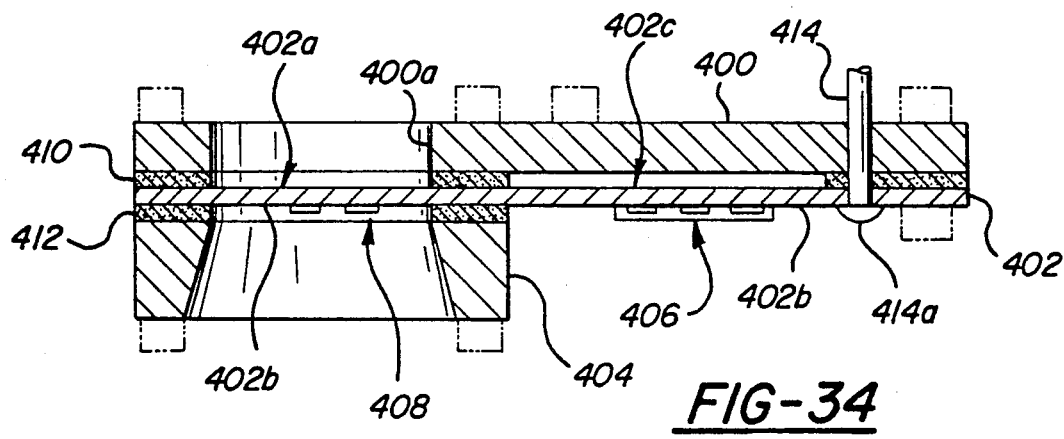

RESISTIVE STRAIN GAUGE PRESSURE SENSOR

BACKGROUND OF THE INVENTION

This invention relates to pressure transducers and more particularly to resistive strain gauge pressure sensors.

It is often necessary to determine the pressure of gases and liquids for purposes of measurement or control and many transducers and sensors have been proposed to facilitate the determination of the pressure of gases and liquids. One general type of transducer or sensor for such applications is a resistive strain gauge sensor in which the pressure is sensed and measured based on dimensional changes in strain gauges which generate proportional changes in the resistance of the gauges.

Whereas many types of resistive strain gauge pressure sensors have been designed and made commercially available and whereas the various resistive strain gauge sensors have proven to be generally satisfactory, these sensors tend to be rather expensive and, further, often suffer failure in vibratory work environments. Specifically, prior art resistive strain gauge pressure sensors have often required soldering to complete the sensor circuitry and the soldered joints are expensive to produce and are subject to failure in vibratory work environments.

SUMMARY OF THE INVENTION

This invention is directed to the provision of a resistive strain gauge pressure sensor having a simple, inexpensive and effective design.

Specifically, this invention is directed to the provision of a resistive strain gauge pressure sensor in which all solder joints have been eliminated.

The invention sensor is of the type including a diaphragm, circuitry on the diaphragm including a plurality of leads having free ends, and a circuit board mounting the diaphragm and including further circuitry including a corresponding plurality of leads having free ends. According to the invention, the free ends of the diaphragm leads are electrically connected to the free ends of the circuit board leads by a conductive paste material. This arrangement eliminates the solder joints between the circuit board and diaphragm leads and thereby eliminates the cost of soldering as well as the potential failure mode embodied in the soldered joints.

According to a further feature of the invention, the circuit board and the diaphragm are bonded together by a frit layer and electrical connection between the respective diaphragm lead free ends and the circuit board lead free ends is established through the frit layer. This arrangement provides a simple and effective means for electrically interconnecting the free ends of the leads utilizing a preexisting dielectric environment.

According to a further feature of the invention, the frit layer includes voids respectively associated with each diaphragm lead free end and the electrical connection between the respective diaphragm lead free ends and the circuit board lead free ends is established by a conductive paste material positioned in the voids. This specific arrangement of the frit layer voids and the paste material provides a convenient and effective packaging for the paste material.

In the disclosed embodiments of the invention, the sensor is a strain gauge pressure sensor, the diaphragm circuitry includes a plurality of strain gauges electrically interconnected to the diaphragm circuitry leads, the circuitry on the circuit board includes input and output terminals and a conditioning circuit, and the conductive paste material is a conductive epoxy material.

BRIEF DESCRIPTION OF THE DRAWINGS

FIG. 5 is a fragmentary perspective view of the circuit board;

FIG. 6 is a bottom view of the diaphragm;

FIG. 7 is a bottom view of the circuit board;

FIG. 8 is a detail view corresponding to FIG. 4 but showing a modification of the FIG. 1 embodiment;

FIGS. 9 and 10 show a further modification of the FIG. 1 embodiment;

FIG. 11 is a perspective view of a second embodiment of the invention sensor;

FIG. 12 is a cross sectional view taken on line 12—12 of FIG. 11;

FIG. 13 is a detail view taken within the of FIG. 12;

FIG. 14 is a perspective view of a circuit board and diaphragm subassembly utilized in the FIG. 11 embodiment;

FIG. 15 is a top view of the diaphragm of the FIG. 11 embodiment;

FIG. 16 is a detail view corresponding to FIG. 13 but showing a modification of the FIG. 11 embodiment;

FIG. 17 is a perspective view of a third embodiment of the invention sensor;

FIG. 18 is a cross sectional view taken on line 18—18 of FIG. 17;

FIG. 19 is a detail view taken within the circle 19 of FIG. 18;

FIG. 20 is a perspective view of a circuit board and diaphragm subassembly utilized in the FIG. 17 embodiment;

FIG. 21 is a bottom view of the circuit board of the FIG. 17 embodiment;

FIG. 22 is a top view of the diaphragm of the FIG. 17 embodiment;

FIGS. 23-25 are views of a modification of the FIG. 17 embodiment;

FIGS. 26-31 are views of a fourth embodiment of the invention sensor with FIG. 28 taken on line 28—28 of FIG. 27 and FIG. 30 a detail view of the area within the circle 30 of FIG. 28;

FIGS. 32 and 33 are views of modifications of the FIGS. 26-31 embodiment;

FIGS. 34 and 35 are cross-sectional and bottom views respectively of a fifth embodiment of the invention sensor;

DETAILED DESCRIPTION OF THE PREFERRED EMBODIMENT

Figure 1:
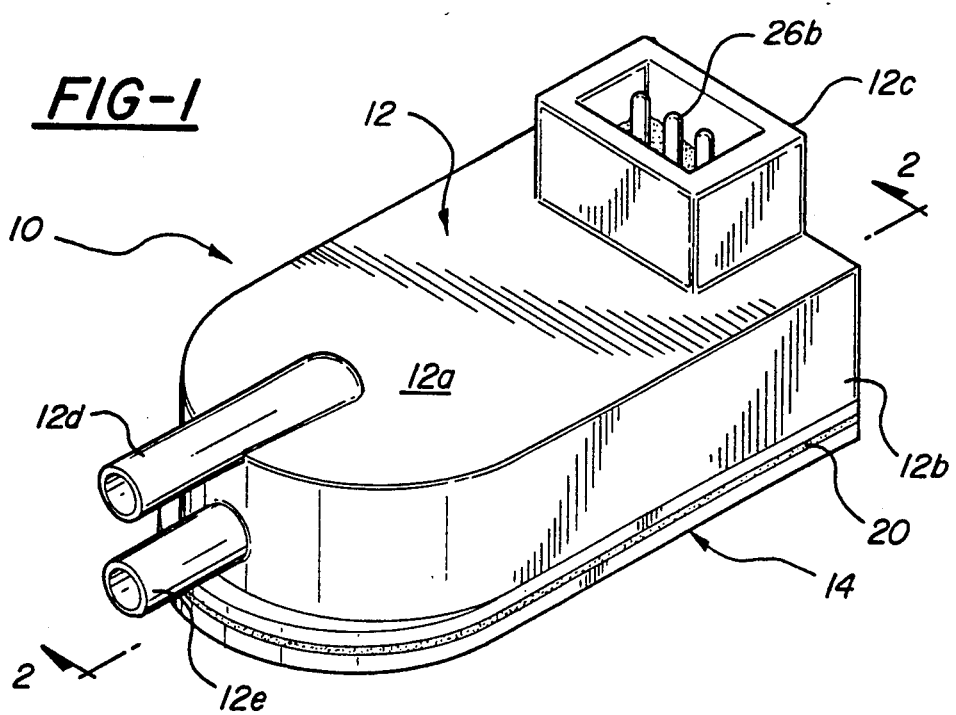
FIG. 1 is a perspective view of a first embodiment of a resistive strain gauge pressure sensor according to the invention.
Figure 2:
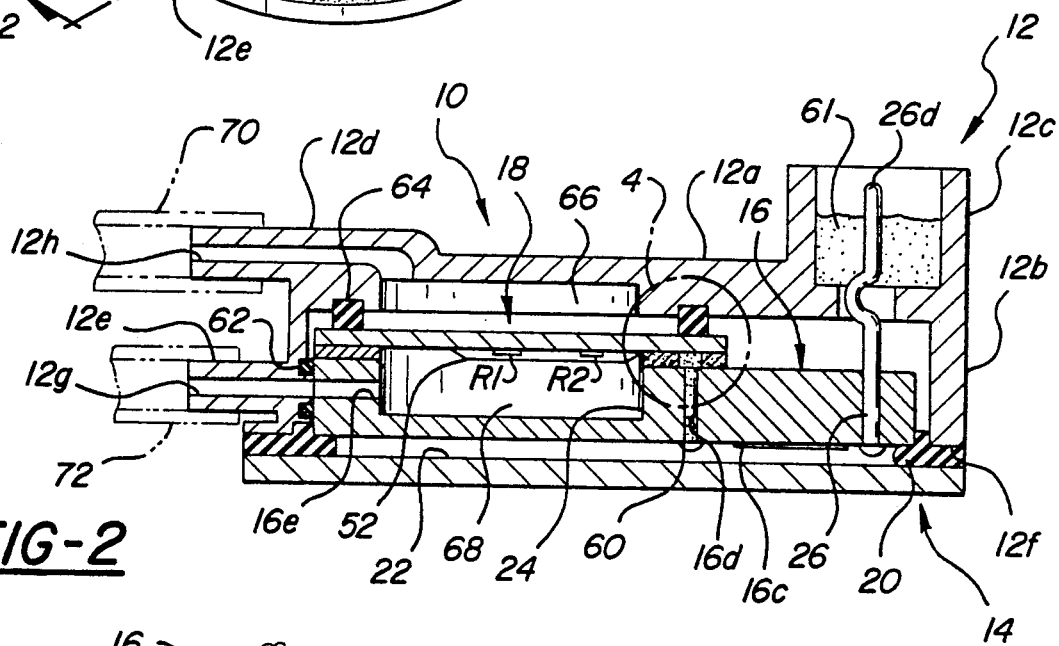
FIG. 2 is a cross sectional view taken on line 2—2 of FIG. 1.

The first embodiment of the invention sensor seen in FIGS. 1-10, broadly considered, includes an upper housing 12, a lower housing 14, a circuit board 16, and a diaphragm 18.

Upper housing 12 is formed of an aluminum or a suitable plastic material and includes a main body upper portion 12a, a skirt or side wall portion 12b, an upstanding socket or receptacle portion 12c, and conduit or tube portions 12d and 12e.

Lower housing 14 has a generally plate like configuration and is secured to the lower annular edge 12f of upper housing side wall 12b with an annular seal 20 interposed therebetween so that the upper and lower housings coact to define a sealed chamber 22 therewithin. Lower housing 14 may be secured to upper housing 12 by any suitable means such for example as by fasteners (not shown).

Circuit board 16 is formed of a suitable dielectric material such as alumina and includes a rectangular end portion 16a and an arcuate end portion 16b. A circular recess or cut-out 24 is provided in arcuate end portion 16b in concentric relation to the arcuate surface of end portion 16b. The circuit board 16 further includes a plurality of connector pins 26 and electrical circuitry 28.

Connector pins 26 pass downwardly through apertures in the circuit board proximate rectangular end 16a and terminate on the lower face 16c of the circuit board in a positive terminal 26a, a ground terminal 26b, and a negative terminal 26c.

Circuitry 28 includes a conditioning circuit 30, leads 32 interconnecting the terminals 26a, b and c with the conditioning circuit, and leads 34 connected at one end to the conditioning circuit and defining free ends 34a.

Conditioning circuit 30 will be understood to include various circuit elements to modulate the output signal of the strain gauge and may include, for example, printed resistors for adjusting and balancing the circuit and for temperature compensation; discrete IC amplifiers to amplify the strain gauge output; discrete diodes for temperature compensation; and discrete capacitors for filtering out unwanted high response noise.

Lead ends 34a terminate respectively in alignment with a plurality of circumferentially spaced apertures 16d in circuit board 16. Apertures 16d lie on an arc centered on the center of recess 24. An annular layer of glass frit 40 is provided on the upper face 16e of the circuit board in surrounding relation to recess 24, and a plurality of circumferentially spaced voids 40a are provided in annular frit layer 40 in respective overlying alignment with apertures 16d.

Diaphragm 18 comprises a circular plate member and is formed of a suitable dielectric material such as alumina. Diaphragm 18 has a size corresponding to the outer diameter of frit layer 40 so that it may overlay frit layer 40 with its arcuate side edge 18a conforming to the arcuate surface of arcuate end 16b of the circuit board.

An annular glass frit layer 42 is provided on the lower face 18b of the diaphragm and includes a plurality of circumferentially spaced voids 42a. Frit layer 42 and voids 42a correspond in size and configuration respectively to frit layer 40 and frit voids 40a so that, with diaphragm 18 positioned over circuit board 16, frit layer 42 overlies frit layer 40 and frit voids 42a are in respective vertical alignment with frit voids 40a and therefore with apertures 16d.

A strain gauge circuit 44 is provided on the lower face 18b of diaphragm 18. Strain gauge circuit 44 includes strain gauges R1, R2, R3 and R4 distributed over the area of diaphragm surface 18b in a manner such that, with a given deflection of the diaphragm, certain of the gauges experience elongation and certain of the gauges experience compression. Strain gauges R1, R2, R3 and R4 are arranged in a well known Whetstone Bridge configuration with various leads interconnecting the gauges and with four leads 50 extending to a location proximate the periphery of the diaphragm. Each lead 50 passes beneath frit layer 42 and terminates in a free end 50a positioned within a respective void 42a of frit layer 42.

The circuitry 28 on the lower face of circuit board 16 and the circuitry 44 on the lower face of diaphragm 18, with the exception of the discrete circuit components, are preferably provided in a thick film screen printing operation in which suitable material is screen printed onto the respective faces of the circuit board and diaphragm to provide the various elements of the circuitry. Following the screen printing of the diaphragm circuitry 44, a layer of thick film 52 of dielectric glass material is suitably applied over the strain gauge circuitry 44 as a protective coating for the strain gauge circuitry. Frit layers 40 and 42, including voids 40a and 42a, may also be applied in a screen printing operation.

Figure 3:
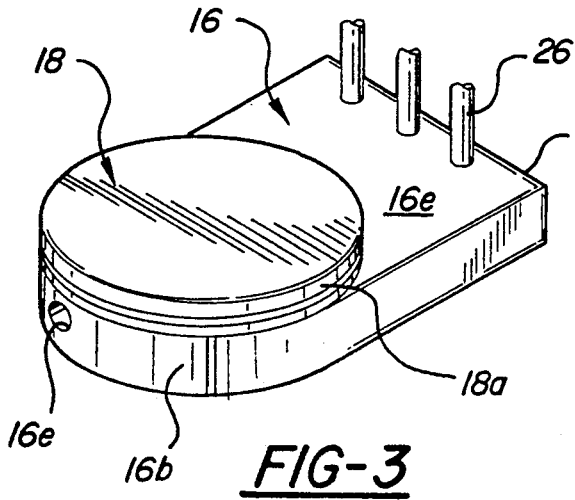
FIG. 3 is a perspective view of a circuit board and diaphragm subassembly utilized in the FIG. 1 embodiment.
Figure 4:
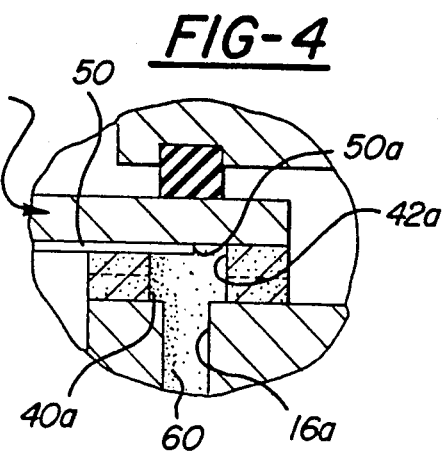
FIG. 4 is a detail view taken within the circle 4 of FIG. 2.

To form the circuit board and diaphragm subassembly seen in FIG. 3, the diaphragm is positioned in overlying relation to the circuit board and the glass frit layers 40 and 42 are suitably fused together to form a unitary glass frit layer between the lower face of the diaphragm and the upper face of the circuit board with the voids 42a in the frit layer 42 coacting with the voids 40a in the frit layer 40 to define four voids or openings in respective vertical alignment with apertures 16d in the circuit board. Thereafter, suitable conductive paste material 60 is injected, as for example with a needle, into the lower ends of the apertures 16d so as to fill the apertures 16d and the voids in the frit layer to form columns providing electric connections between the respective free ends 34a of the leads 34 and the respective free ends 50a of the leads 50. The conductive paste material is preferably an epoxy material with finely ground silver particles dispersed throughout the epoxy to form a conductive epoxy material. Following the injection of the epoxy material into the apertures 16d, the circuit board and diaphragm subassembly is placed in an oven to cure the conductive epoxy material.

In the assembled relation of the sensor, the diaphragm and circuit board subassembly is positioned in the cavity 22 defined by the upper and lower housings with the lower annular edge of the circuit board seating on seal 20; connector pins 26 extending upwardly from circuit board 16 for passage through suitable insulating material 61 in socket portion 12c to position the upper ends 26d of the pins within socket 12c; an O-ring 62 positioned in the side wall 12b of upper housing 12 encircling an aperture 16e in circuit board 16 with aperture 16e in alignment with the central passage 12g of conduit 12e; an annular seal 64 engaging the annular upper periphery of the diaphragm 18; and diaphragm 18 defining an upper chamber 66 overlying the diaphragm and in communication with the central passage 12h of conduit 12d and a lower chamber 68 underlying the diaphragm and in communication with passage 12g of conduit 12e via aperture 16e.

In use, hoses 70, 72 are respectively fitted over conduits 12d and 12e to communicate the gas or fluid pressures in hoses 70 and 72 respectively with the upper chamber 66 and the lower chamber 68 so as to produce a selective deflection of the diaphragm in proportion to the pressure differential between the fluid pressures in the upper and lower chambers 66 and 68 as transmitted by hoses 70 and 72. With a suitable power plug plugged into socket 12c for coaction with connector pins 26, and in response to the generation of a differential pressure across the diaphragm, output voltage appears across ground terminal 26b and positive terminal 26a which is proportional to the differential pressure being experienced by the diaphragm.

The electrical signals from the terminals to the strain gauge circuitry and from the strain gauge circuitry to the terminals are transmitted by the conductive epoxy columns 60 positioned in the apertures 16d in the circuit board, providing a positive electrical interconnection between the leads of the circuit board circuitry and the leads of the diaphragm circuitry without incurring the expense of a soldering operation and without creating a potential sensor failure mode resulting from failure of solder joints in a vibratory work environment. It will be seen that the glass frit layers 40 and 42 not only serve to provide a bonding or seal as between the diaphragm and the circuit board but also define a portion of the column in which the conductive epoxy is deposited so that the frit acts as an insulator with respect to the conductive epoxy.

The sensor of the modification of the FIG. 1 embodiment seen in FIG. 8 is substantially identical to the sensor of FIGS. 1-7 with the exception that the strain gauge circuitry is provided on the upper face 18c of the diaphragm, a series of circumferentially spaced apertures 74 is provided in the diaphragm in respective alignment with apertures 16d and with the voids in the frit layer, and the conductive epoxy material 60 extends upwardly through apertures 74 for electrical encapsulation at its upper ends of the respective free ends 50a of the leads 50 of the strain gauge circuitry.

In the modification of the FIG. 1 embodiment seen in FIGS. 9 and 10, the aperture 16e in the circuit board is replaced by an upwardly opening groove 16g and the O-ring seal 62 is eliminated.

The second sensor embodiment seen in FIGS. 11-15 includes an upper housing 80, a lower housing 82, a circuit board 84, a diaphragm 86, and a support ring 88. Housings 80 and 82 may be formed of aluminum or suitable plastic and members 84, 86 and 88 may be formed of a suitable dielectric material such as alumina.

Upper housing 80 includes a conduit 80a having a central passage 80b communicating with a downwardly opening cavity 80c defined on the lower face of the housing and lower housing 82 includes a conduit 82a defining a central passage 82b for communication with an upwardly opening cavity 82c defined by the housing 82. Lower housing 82 also defines a further upwardly opening cavity 82d and further includes a downwardly extending socket portion 82e.

Circuit board 84 includes a rectangular end 84a and a circular end 84b with a circular cut-out or aperture 84c in concentric relation to the arcuate surface of circular end 84b. A plurality of connector pins 26 extend upwardly through circuit board 84 proximate rectangular end 84a and terminate in positive terminal 26a, ground terminal 26b, and negative terminal 26c. A plurality of apertures 84d are provided in circuit board 84 proximate opening 84c and arranged on an arc centered on the center of aperture 84c, and an annular glass frit layer 89 is formed on the underface of the circuit board in surrounding relation to cut-out 84c. Layer 89 includes a plurality of circumferentially spaced voids 89a vertically aligned respectively with apertures 84d. Circuitry 90 is provided on the upper face 84e of the circuit board and includes a conditioning circuit 90 (corresponding to the conditioning circuit 30 of the FIGS. 1-7 embodiment); leads 92 connecting the terminals 26a, b and c with the conditioning circuit, and leads 94 extending from the conditioning circuit and terminating in free ends 94a respectively overlying apertures 84d.

Diaphragm 86 comprises a circular plate sized to conform to the rounded end 84b of the circuit board. Strain gauge circuitry 96 is provided on the upper face 86a of the diaphragm. Circuitry 96 includes strain gauge resistors R1, R2, R3 and R4, arranged in known manner in a Whetstone Bridge configuration, and a plurality of leads 98 terminating in free ends 98a proximate the peripheral edge of the diaphragm. An annular frit layer 100 is formed on the upper face 86a of the diaphragm in surrounding relation to strain gauge circuitry 96 and frit layer 100 includes a plurality of circumferentially spaced voids 100a respectively overlying lead ends 98a.

Support ring 88 has a circular configuration corresponding to the circular configuration of diaphragm 86 and defines a central aperture 88a corresponding in size and configuration to the aperture 84c in the circuit board.

To assembly the circuit board, diaphragm, and support ring subassembly, support ring 88 is suitably secured to the underface of the diaphragm utilizing an annular frit layer 102 and the diaphragm and support ring assembly is secured to the underface of the circuit board in surrounding relation to opening 84c by fusing frit layer 100 to frit layer 89 with voids 100a and 89a respectively aligned and respectively aligned with apertures 84d, whereafter a conductive epoxy 104 is injected as by a needle downwardly into apertures 84d and into adjacent frit voids 89a and 100a to provide conductive epoxy columns for connecting the respective free ends 98a of leads 98 with the respective free ends 94a of leads 94.

In the assembled relation of the sensor of FIGS. 11-15, housings 80 and 82 are suitably joined together as for example by the use of fasteners; and the diaphragm, circuit board and support ring subassembly is positioned within the hollow of the joined housings with an annular sealing ring 105 sealingly engaging the upper face of the circuit board in surrounding relation to opening 84c, an annular sealing ring 106 sealingly engaging the lower annular face of support ring 88, an annular sealing ring 108 sealingly engaging the upper face 84e of the circuit board, an annular sealing ring 110 sealing engaging the lower face of the circuit board, and connector pins 26 extending downwardly from the circuit board and through insulating material 112 positioned in socket portion 82e to expose the lower ends 26d of the pins within the socket portion.

As with the embodiment of FIGS. 1-7, the frit layers 89 and 100 and the circuitry on the diaphragm and on the circuit board (with the exception of the discrete circuit components) are preferably provided in a thick film screen printing operation in which suitable material is screen printed onto the diaphragm and circuit board to provide the frit layers and the various elements of the circuitry.

In the use of the sensor of FIGS. 11-15, hoses are respectively fitted over conduits 80a and 82b to transmit the respective hose pressures into chambers 80c and 82c so as to deflect the diaphragm 86 in proportion to the pressure differential and generate an output signal at the positive and ground terminals 26a and 26b of circuitry 88 that is proportional to the deflection being experienced by the diaphragm and therefore proportional to the pressure differential in the hoses. The electrical signals transmitted to the strain gauge circuitry from the terminals and from the strain gauge circuitry to the terminals passes through the conductive paths provided by the conductive epoxy columns 104, thereby eliminating solder connections as between the circuit board and diaphragm circuitry.

In the modification of the FIG. 11 embodiment seen in FIG. 16, the free ends 98a of the leads 98 extend completely beneath the frit layers 89 and 100 to position the free ends 98a immediately radially outwardly of the frit layers and the apertures 84d in the circuit board are relocated so as to continue to be in vertical alignment with the respective free ends 98a. The conductive epoxy columns 104 extend downwardly through the circuit board and engage the free ends 98a of the leads 98 at a location radially outwardly of the frit layer.

The third sensor embodiment seen in FIGS. 17-22 includes an upper housing 120, a lower housing 122, a circuit board 124, a diaphragm 126, and a support ring 128.

Housings 120 and 122 are preferably formed of aluminum or a plastic material and members 124, 126 and 128 are preferably formed of a dielectric material such as alumina.

Upper housing 120 includes a main body portion 120a defining a downwardly opening cavity 120b, a socket portion 120c, and a conduit or tube portion 120d including a central passage 120e opening in chamber 120b.

Lower housing 122 includes a main body portion 122a defining an upwardly opening cavity 122b and a further upwardly opening cavity 122c, and a conduit or tube portion 122d defining a central passage 122e communicating with cavity 122b.

Circuit board 124 includes a rectangular end portion 124a and a circular end portion 124b and further includes a central opening 124c disposed concentrically relative to circular end portion 124b. A plurality of connector pins 26 extend downwardly through circuit board 124 proximate rectangular end 124a to define a positive terminal 26a, a ground terminal 26b, and a negative terminal 26c on the lower face 124d of the board, and circuitry 130 is provided on the lower face of the board.

Circuitry 130 includes a conditioning circuit 132 (corresponding to the conditioning circuit 30 of the FIGS. 1-7 embodiment), a plurality of leads 134 interconnecting the conditioning circuit and terminals 26a, 26b and 26c, and a plurality of leads 136 connected to the conditioning circuit 132 and terminating in free ends 136a. An annular frit layer 138 is formed on the lower face 124d of the circuit board in a screen printing operation in surrounding relation to opening 123c and in overlying relation to the free end portions of leads 136. Frit layer 138 includes a plurality of circumferentially spaced voids 138a arranged on an arc centered on the center of opening 123c and respectively overlying and exposing lead free ends 136a.

Diaphragm 126 in the form of a circular plate corresponding in configuration to the circular end 124b of the circuit board and includes an annular frit layer 140 screen printed onto the upper face 126a of the diaphragm and strain gauge circuitry 142 also on the upper face 126a of the diaphragm. Strain gauge circuitry 142 includes a plurality of strain gauges R1, R2, R3, R4 arranged in a typical Whetstone Bridge configuration and a plurality of leads 144 terminating in free ends 144a respectively positioned in circumferentially spaced voids 140a in frit layer 140. Voids 140a are arranged on an arc centered on the center of diaphragm 126.

Support ring 128 corresponds in size and configuration to diaphragm 126 and includes a central aperture 128a corresponding in size and configuration to opening 123c in the circuit board.

To assemble the circuit board diaphragm and support ring subassembly, the support ring 128 is secured to the lower face of diaphragm 126 utilizing a frit layer 150; a conductive paste 152 is positioned in frit layer voids 138a and frit layer voids 140a in a screen printing operation; and the diaphragm is secured to the underface of the circuit board by fusing frit layer 140 to frit layer 138 with frit layer voids 138a in respective vertical alignment with frit layer voids 140a so that the conductive paste 152 forms conductive columns extending between respective lead free ends 144a and lead free end 136a so as to electrically interconnect the strain gauge circuitry and the circuit board circuitry without the use of solder. Conductive paste 152 may comprise a suitable organic carrier material and finely ground silver particles dispersed throughout the carrier. During the fusion of the frit layers 138 and 140 the organic carrier material of the conductive paste is burned off to leave a conductive column of fused together silver particles electrically interconnecting lead free ends 144a and lead free ends 136a.

In the assembled relation of the sensor of FIG. 17, the circuit board, diaphragm, and support ring subassembly is positioned within the hollow defined by the housing members; an annular sealing ring 160 engages the upper face of circuit board 124 in surrounding relation to opening 123c; an annular sealing ring 162 engages the lower annular surface of support ring 128; an annular sealing ring 164 engages the upper face of circuit board 124 proximate rectangular end 124a; an annular sealing ring 166 engages the underface of circuit board 124; and connector pins 26 extend upwardly from circuit board 124 and pass through insulating material 168 positioned in socket portion 120c to position the upper ends 26d of the connector pins within socket portion 120c.

When differential pressure is supplied across the diaphragm 126 by communicating conduits 120d and 122d with fluids at different pressures, the output signal generated by the flexing of the diaphragm is connected to the output terminals of the sensor via the fused columns 152 positioned in the voids in the frit layer interconnecting the circuit board and the diaphragm.

Figure 24:
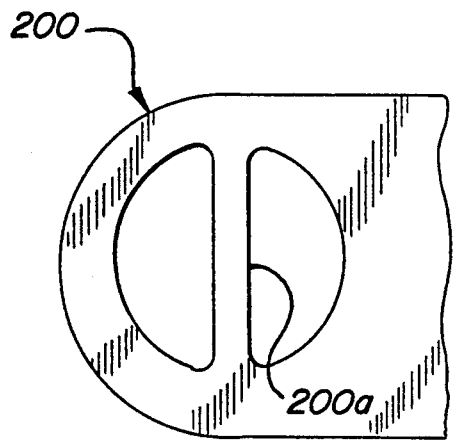
Figure 25:
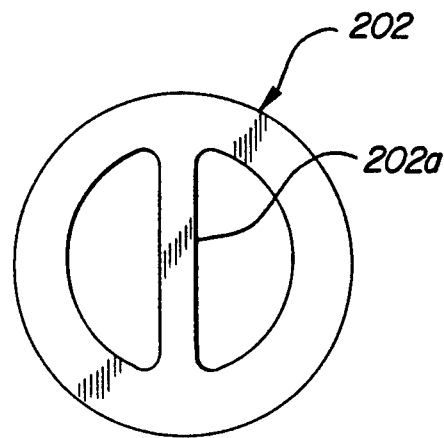
Figure 26:
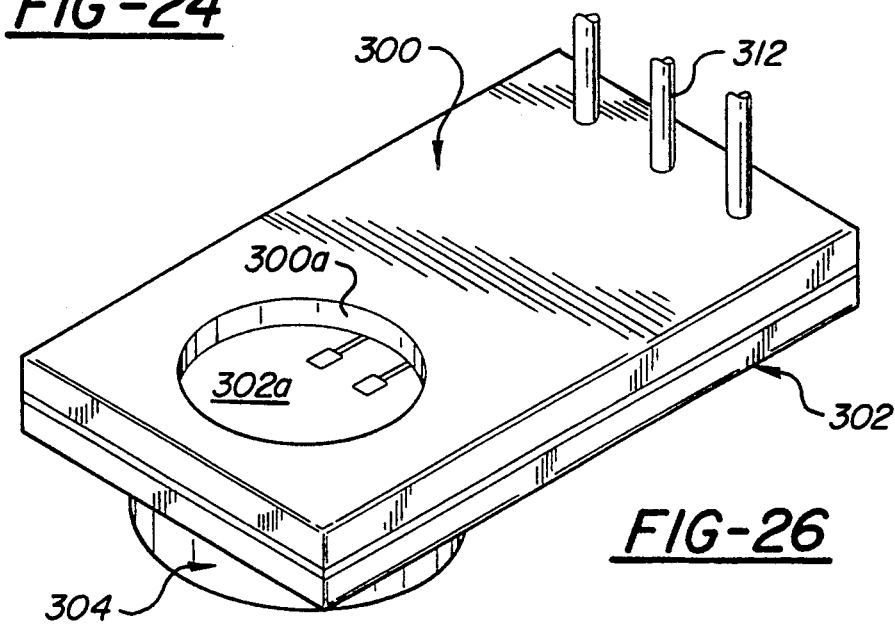
Figure 27:
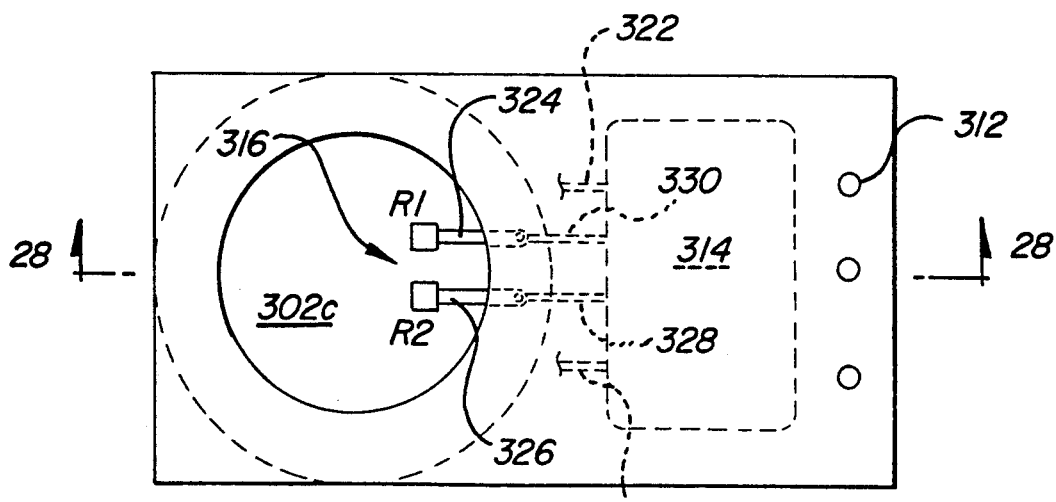

The modification of the FIG. 17 embodiment seen in FIGS. 23-25 is identical to the FIG. 17 embodiment except that the circuit board 200 and the support ring 202 are each provided with an integral central crossbar 200a and 202a which, in the assembled relation of the circuit board diaphragm and support ring, immediately overlie and immediately underlie the diaphragm 126 to delimit the upward and downward deflection of the diaphragm and thereby protect the diaphragm in a pressure overload situation.

The fourth sensor embodiment seen in FIGS. 26-31 includes a support board 300, a diaphragm 302, and a support ring 304, all of which may be formed, for example, of alumina.

Support board 300 and diaphragm 302 having matching rectangular configurations and support board 300 has a circular aperture 300a proximate one end thereof exposing an active portion 302a of the diaphragm.

Support board 300 is secured to diaphragm 302 in overlying relation thereto by an annular glass frit layer 306 positioned in surrounding relation to support board aperture 300a and diaphragm active portion 302a and by a further linear glass frit layer 308 securing the ends of the support board and diaphragm together remote from the aperture 302a.

Support ring 304 has a circular annular configuration with a central aperture 304a corresponding in size to the aperture 300a of the support board. Support ring 304 is secured to diaphragm 302 in underlying relation thereto by an annular frit layer 310 with aperture 304 aligned vertically with aperture 300a.

A plurality of connector pins 312 extend downwardly and pass through circuit board 300, frit layer 308, and diaphragm 302 to define terminals 312a on the underface 302b of the circuit board.

A conditioning circuit 314 is provided on the underface 302b of the diaphragm and a strain gauge circuit 316 is provided on the active portion 302a of the diaphragm. Strain gauge circuit 316 includes resistors R1 and R2 positioned on the upper face 302c of the active portion of the diaphragm, and resistors R3 and R4 are positioned on the lower face 302d of the active portion of the diaphragm in respective underlying relation to resistors R1 and R2.

A lead 320 extends from resistor R4 to conditioning circuit 314; a lead 322 extends from resistor R3 to conditioning circuit 314; a lead 324 extends from resistor R1 to a location underlying frit layer 306; a lead 326 extends from resistor R2 to a location underlying frit layer 306; a lead 328 extends from the conditioning circuit to a location overlying frit layer 310; and a lead 330 extends from conditioning circuit 314 to a location overlying frit layer 310.

Leads 324, 330, 326, and 328 include apertures 324a, 330a, 326a, and 328a at their respective free ends corresponding in diameter to a pair of laterally spaced apertures 302d provided in diaphragm 302.

Conditioning circuit 314 will be understood to include various circuit elements to modulate the output signals of the strain gauges and may correspond generally to the conditioning circuit 30 of the FIGS. 1-7 embodiment and, in addition, may include means to arrange resistors R1, R2, R3 and R4 in a Whetstone Bridge configuration.

In the assembled relation of the support board, diaphragm, and support ring, the free end of leads 324 and 326 are positioned at the respective bottoms of a pair of laterally spaced apertures 306a provided in frit layer 306 and respectively overlying apertures 302d in the diaphragm; apertures 310a are provided in frit layer 310 in underlying relation to each diaphragm aperture 302d; the free ends of conduits 328 and 330 are positioned at the respective tops of apertures 310a in respective underlying relation to apertures 302d; and a conductive epoxy paste 60 (such for example as an epoxy material with finely ground silver particles dispersed throughout the epoxy to form a conductive epoxy material) is positioned in the apertures 306a, 302d, and 310a so as to encapsulate the free ends of the leads 324, 326, 328, and 330 and provide an electrical conductive path between leads 324 and 330 and between leads 326 and 328 so as to connect the resistors R1 and R2 on the upper face 302c of the active portion of the diaphragm to the conditioning circuit 314. Resistors R3 and R4 on the underface 302d of the active portion of the diaphragm are connected directly to conditioning circuit 314 by leads 320 and 322 which pass through the frit layer 310 in overlying relation to the frit layer.

As with the previous embodiments, it will be understood that the strain gauge circuitry and the conditioning circuitry, with the exception of the discrete circuit components of the conditioning circuitry, are provided in a thick film screen printing operation. Frit layers 306 and 310 may also be applied in a screen printing operation.

The modification of the FIGS. 26-31 embodiment seen in FIG. 32 is identical to the FIGS. 26-31 embodiment with the exception that a pair of access holes or apertures 300b are provided in the support board 300 in respective overlying relation to the apertures in the frit layers and the apertures in the circuit board so that, following the assembling of the support board, diaphragm, and support ring, the conductive paste 60 may be inserted, utilizing a needle, through apertures 300b into the aligned apertures 306a, 302d and 310a to fill the apertures and provide the electrical interconnection between the leads 324, 330 and 326, 328, whereafter the apertures 300b may be suitably plugged.

The modification of the FIGS. 26-31 embodiment seen in FIG. 33 is identical to the FIGS. 26-31 embodiment with the exception that the laterally spaced apertures 302d in the diaphragm are positioned radially outwardly of the frit layers 306 and 310; there are no apertures provided in the frit layers; the leads 324 and 326 extend completely beneath the frit layer 306 and are positioned radially outwardly of the frit layer with their respective apertures 324a, 326a in alignment with the respective diaphragm apertures 302d; and the conductive epoxy material 60 is suitably inserted into the apertures 302d and into overlying relation with respect to the end of leads 324 and 326 and underlying relation with respect to the ends of the leads 328 and 330 so as to totally encapsulate the free ends of the leads and form an electrical connection between the leads 324, 330, and 326, 328.

Figure 35:
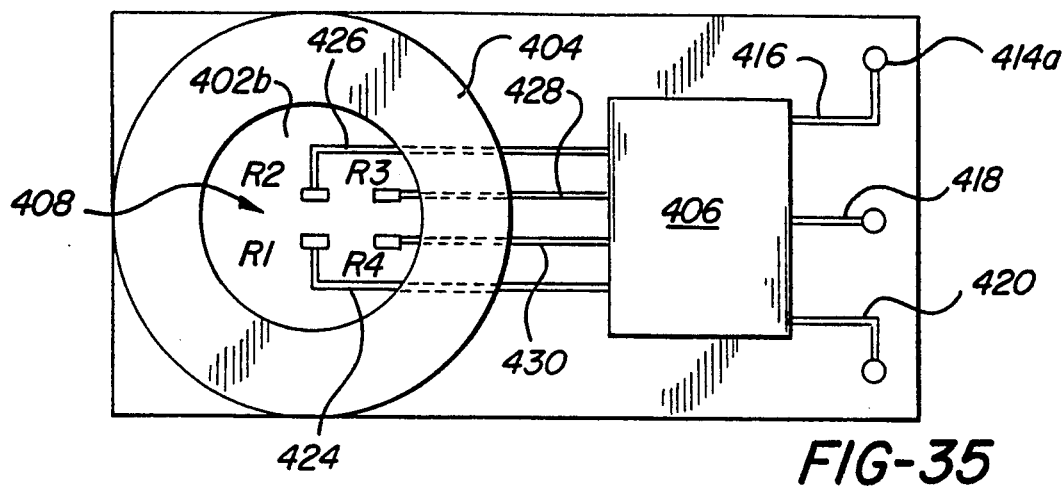

The fifth sensor embodiment seen in FIGS. 34 and 35 includes a support board 400, a diaphragm board 402, and a support ring 404, all formed, for example, of alumina.

Support board 400 and diaphragm board 402 have a generally identical rectangular configuration and support ring 404 has a circular, annular configuration.

Support board 400 includes an aperture 400a in overlying relation to an active portion 402a of the diaphragm board; a conditioning circuit 406 is provided on the underface 402b of an inactive portion 402c of the diaphragm board; a strain gauge circuit 408 is provided on the underface 402b of the active portion 402a of the diaphragm board; circuit board 400 is secured to diaphragm board 402 in overlying relation thereto by an annular frit layer 410; support ring 404 is secured to diaphragm board 402 in underlying relation thereto by an annular frit layer 412; a plurality of connector pins 414 extend downwardly through support board 400 and diaphragm board 402 to define terminals 414a connected to conditioning circuit 406 by leads 416, 418, and 420; and leads 424, 426, 428, and 430 extend respectively from resistors R1, R2, R3, and R4 of the strain gauge circuit and pass through frit layer 412 in overlying relation thereto for connection to conditioning circuit 406.

As with the previous embodiments, the strain gauge circuitry and the conditioning circuitry, with the exception of the discrete circuit components, may be provided in a thick film screen printing operation and the frit layers may also be applied in a screen printing operation. Conditioning circuit 406 may correspond generally to the conditioning circuit 30 of the FIGS. 1-7 embodiment and may also include the circuitry necessary to arrange the resistors in the typical Whetstone Bridge configuration.

Figure 36:
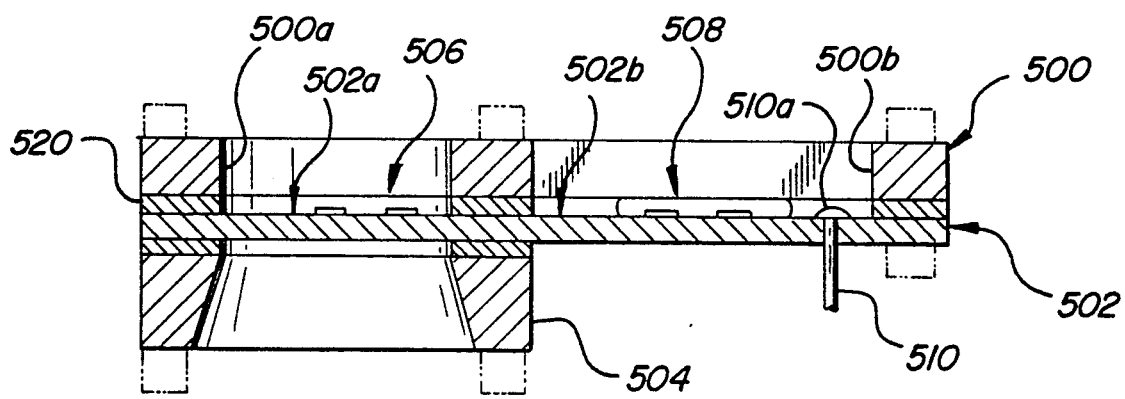
FIGS. 36 and 37 are cross-sectional and top views respectively of a sixth embodiment of the invention sensor.
Figure 37:
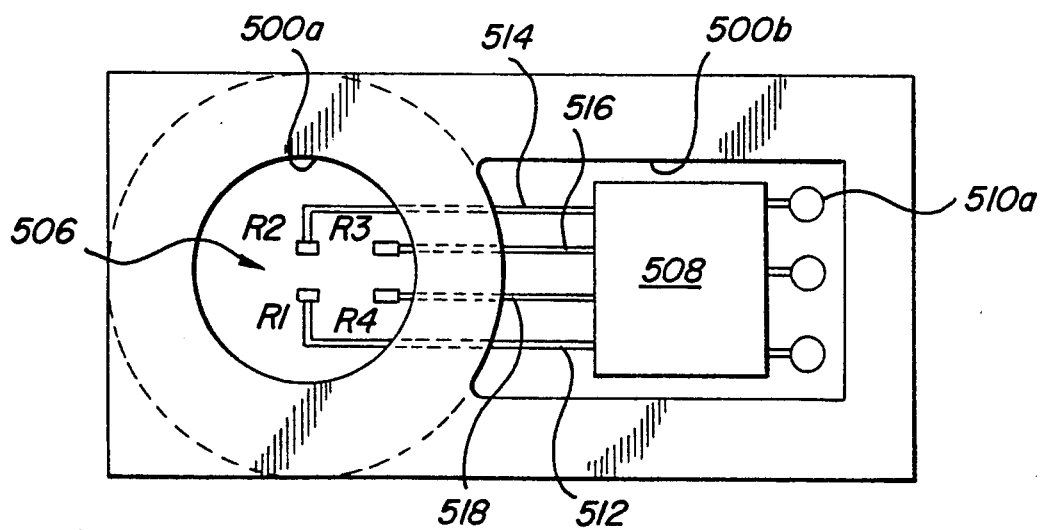

The sixth sensor embodiment seen in FIGS. 36 and 37 is generally similar to the embodiment of FIGS. 34 and 35 with the exception that the circuit board 500 includes an opening 500a in overlying relation to the active portion 502a of the diaphragm board 502 and a further generally rectangular opening 500b overlying the inactive portion 502b of the diaphragm board; the strain gauge circuitry 506 is positioned on the upper face of the active diaphragm portion 502a; the conditioning circuit 508 is positioned on the upper face of the inactive diaphragm portion 502b within the opening 500b; the connector pins 510 extend upwardly through the inactive portion 502b of the circuit board to define terminals 510a for suitable connection to the conditioning circuit 508; and the leads 512, 514, 516, 518 interconnecting the respective resistors, R1, R2, R3 and R4 and the conditioning circuit 508 pass through the frit layer 520 bonding the diaphragm to the support board in underlying relation to the frit layer. As with the previous embodiments, the strain gauge circuitry, the conditioning circuitry, and the frit layers may be applied in a thick film screen printing operation. Conditioning circuit 508 may correspond generally to conditioning circuit 30 of the FIGS. 1-7 embodiment and may also provide means to arrange the resistors in a Whetstone Bridge configuration.

Figure 38:
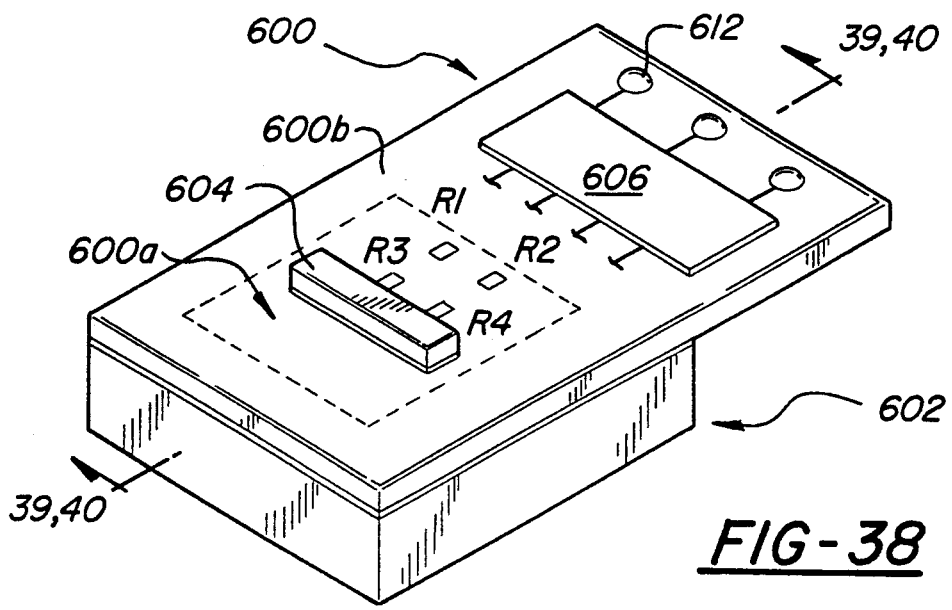
FIGS. 38-40 are perspective and cross-sectional views of a sixth embodiment of the invention sensor.
Figure 39:
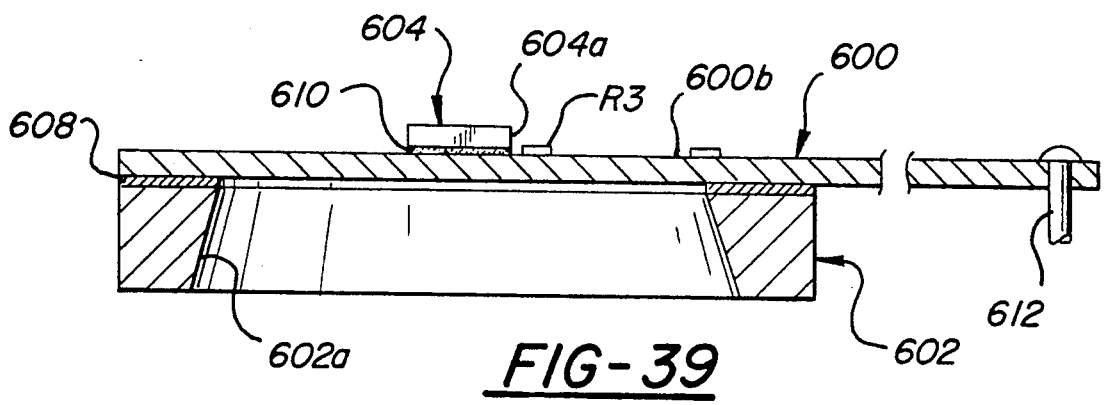
Figure 40:
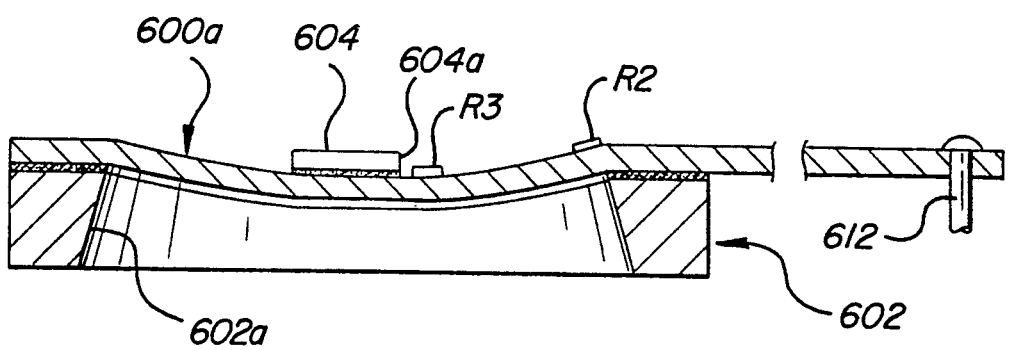
Figure 41:
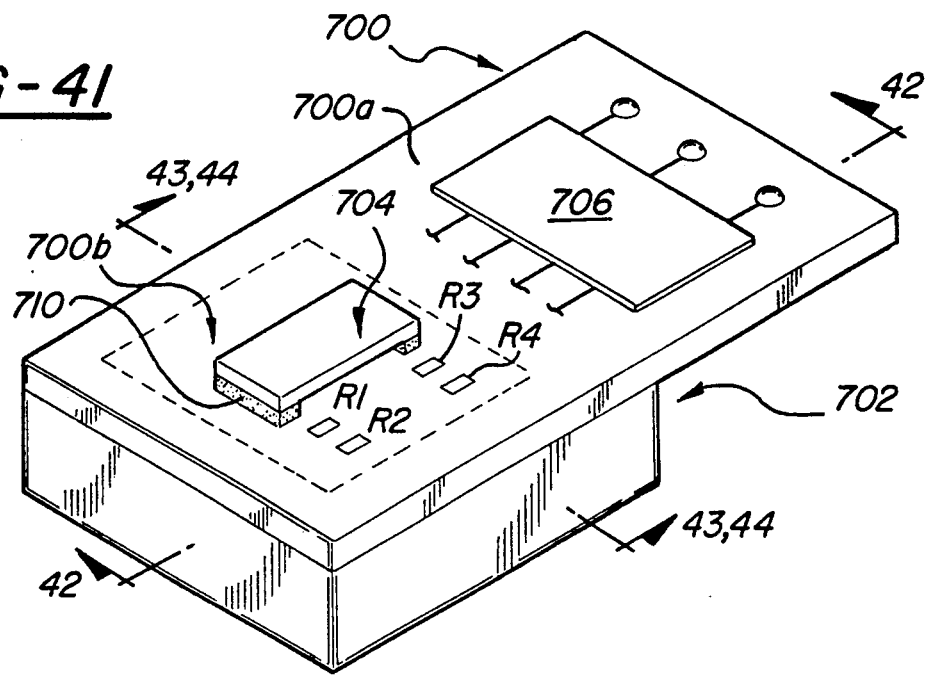
FIGS. 41-44 are perspective and cross sectional views of a seventh embodiment of the invention sensors.
Figure 42:
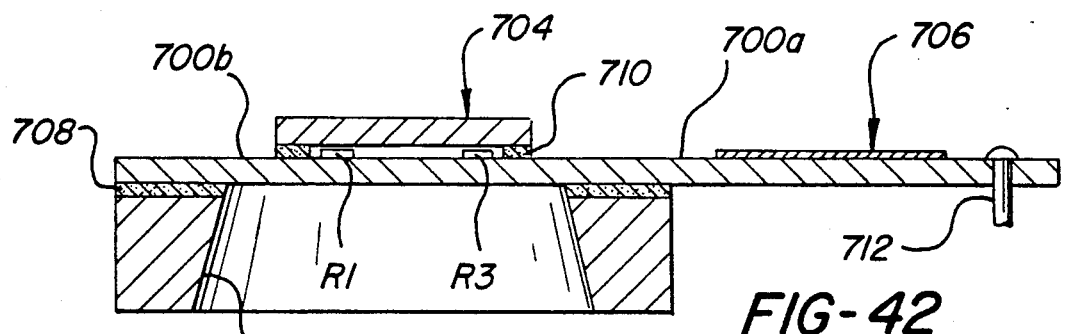
Figure 43:
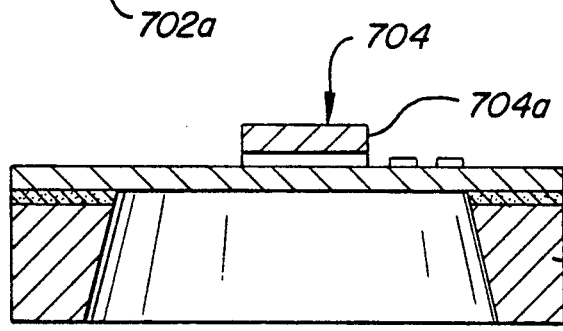

The seventh sensor embodiment seen in FIGS. 38-40 includes a circuit board 600, an annular support member 602, and a stiffening plate 604.

Circuit board 600 includes a diaphragm portion 600a proximate one end of the circuit board. A conditioning circuit 606 is positioned on the upper face 600b of the circuit board proximate the other end of the circuit board. Conditioning circuit 606 corresponds generally to conditioning circuit 30 of the FIGS. 1-7 embodiment and is electrically connected to connector pins 612 to provide power input and power output for the sensor in known manner. A plurality of resistors R1, R2, R3, and R4 are positioned in spaced relation on the upper face of diaphragm portion 600a. Resistors R1, R2, R3, and R4 are arranged in a generally rectangular pattern, are connected in known manner in a Wheatstone Bridge configuration, and are suitably electrically connected to conditioning circuit 606.

Annular support member 602 is of generally rectangular configuration and defines a central rectangular opening 602a having a size and configuration corresponding to the diaphragm portion 600a of the circuit board. Support member 602 is secured to the underface of the circuit board by an annular frit layer 608 so that the opening 602a of support member 602 delimits and defines the diaphragm portion 600b of the circuit board and so that the diaphragm portion is supported along its edges but is free to flex upwardly and downwardly between its edges in response to differential pressure applied across the diaphragm portion.

Stiffening plate 604 is secured as by a frit layer 610 to the upper face of the diaphragm portion 600a and extends transversely of the major or longitudinal dimension of the circuit board with its right hand edge (as viewed in FIGS. 39 and 40) 604a positioned proximate one side edge of the rectangular strain gauge pattern and, specifically, proximate the resistors R3 and R4.

As seen in FIG. 40, representing deflection of the diaphragm portion 600b in response to differential pressure applied across the diaphragm, the stiffening plate 604 has the effect of accentuating the strain experienced by the strain gauges R3 and R4 in response to diaphragm deflection, as opposed to the strain which would be experienced by resistors R3 and R4 in the absence of the stiffening plate. The stiffening plate 604 has the effect of concentrating diaphragm strain in the region of the plate and thereby in the region of the resistors R3 and R4 so that, for a given overall deflection of the diaphragm, the strain experienced by the resistors R3 and R4 will be greater than in a diaphragm without a stiffening plate so that the sensor is very responsive to diaphragm deflection and exhibits greater sensitivity. Note that the resistors R1 and R2 also exhibit accentuated strain by virtue of their location proximate the inner periphery of the support ring 602 so that the sensors R1, R2, R3 and R4 in combination experience a relatively large strain in response to a given diaphragm deflection and thereby provide greater sensitivity to the sensor.

The seventh sensor embodiment seen in FIGS. 41-44 is generally similar to the embodiment of FIGS. 38-40 with the exception that the stiffening plate 704 extends generally longitudinally of the sensor and the strain gauges R1, R2, R3 and R4 are arranged in a rectangular pattern and are positioned laterally to one side of the stiffening plate 704 with one side edge 704a of the stiffening plate proximate one side edge of the strain gauge rectangular pattern. Plate 704 is cemented to the upper face 700a of the diaphragm portion 700b of the circuit board by parallel linear frit layers 710 at each end of the stiffening plate. It will be understood that strain gauges R1, R2, R3 and R4 are arranged in a typical Wheatstone bridge configuration and are suitably connected to conditioning circuit 706 which may correspond generally to the conditioning circuit to the FIGS. 1-7 embodiment and which is connected electrically to connector pins 712 so as to provide power input and power output for the sensor in known manner. As with the FIGS. 38-40 embodiment, the support member 702 is rectangular and annular, is positioned beneath the circuit board 700 by an annular frit layer 708, and has a central rectangular opening 702a which defines and delimits the diaphragm portion 700b of the circuit board so that the diaphragm portion is supported along its edges by the support member 702 but is free to flex upwardly and downwardly between its edges in response to differential pressure applied across the diaphragm portion.

Figure 44:
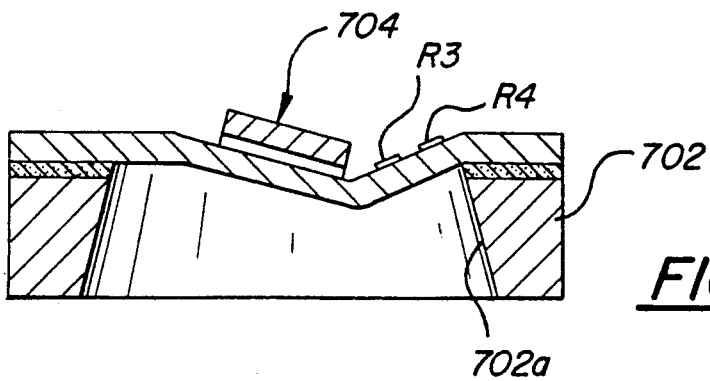

As best seen in FIG. 44, as the diaphragm portion 700b experiences deflection in response to differential pressure applied across the diaphragm, the stiffening plate 704 has the effect of concentrating the strain experienced by the diaphragm in the region of the diaphragm proximate the edge 704a of the plate so that the resistors R1 and R3, which are positioned proximate the edge 704a, also experience increased strain in response to a given diaphragm deflection so as to increase the sensitivity of the sensor. As with the FIG. 38-40 embodiment, the resistors R2 and R4 are also located in a region of strain concentration proximate the inner edge of the support member 702 so that all of the strain gauges experience an accentuated strain in response to a given diaphragm deflection whereby to increase the overall sensitivity of the sensor.

Figure 45:
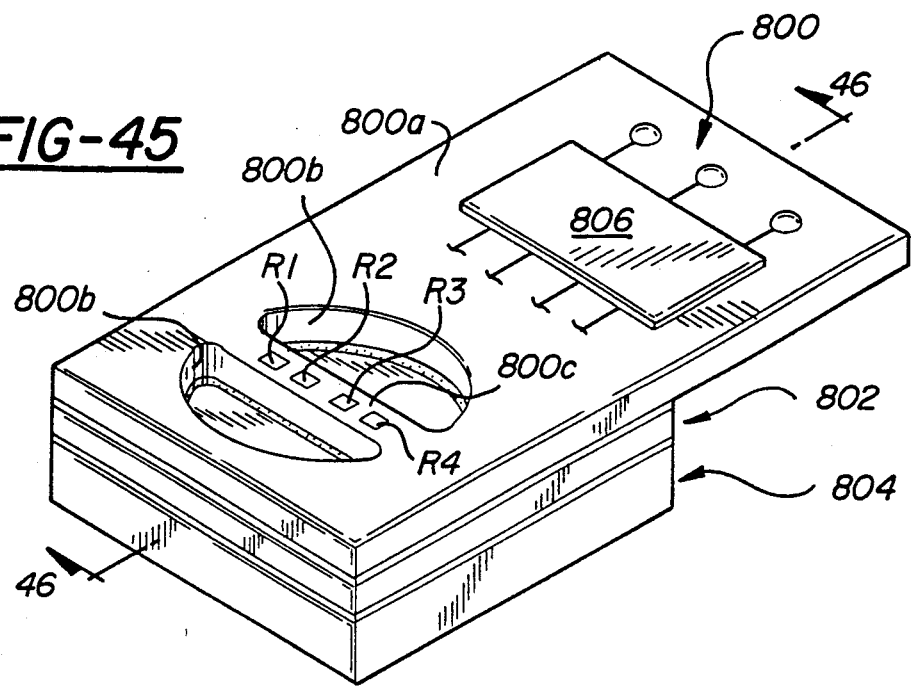
FIGS. 45-47 are perspective, cross-sectional and top views of an eighth embodiment of the invention sensor.
Figure 46:
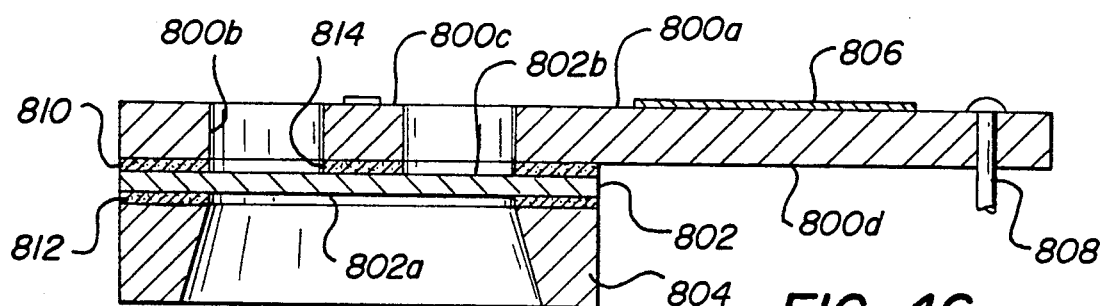
Figure 47:
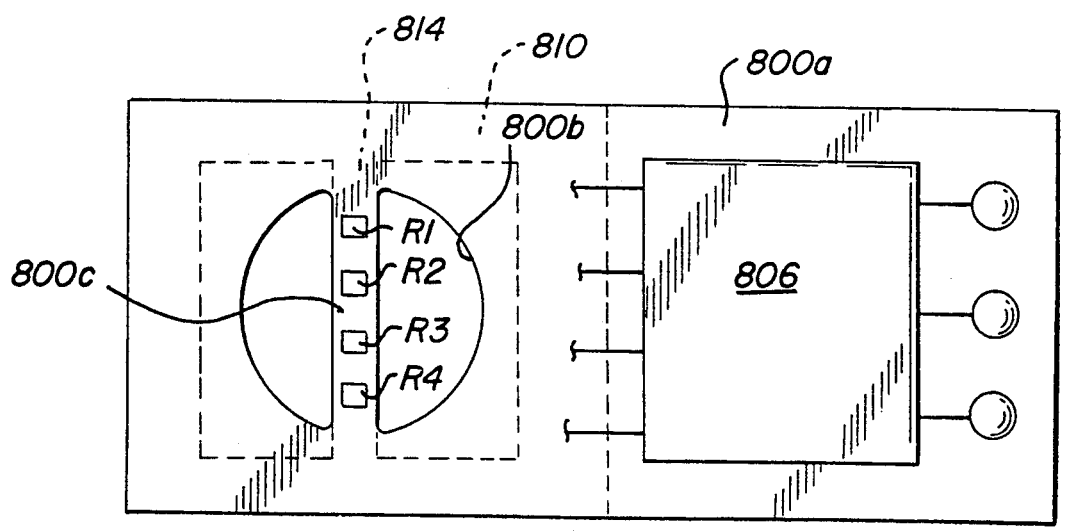

The eighth sensor embodiment seen in FIGS. 45-47 includes a circuit board 800, a diaphragm 802 and a support member 804.

Circuit board 800 is relatively thick and includes a conditioning circuit 806 positioned on the upper face 800a of the circuit board. Conditioning circuit 806 corresponds generally to the conditioning circuit 30 of the FIGS. 1-7 embodiment and is electrically connected in known manner to conductor pins 808 to provide input and output signals to and from the sensor. The end of the circuit board 800 opposite the connector pin end includes a pair of arcuate cut-outs 800b which coact to define a central bridge portion 800c extending generally transversely of the longitudinal centerline of the circuit board. Resistors R1, R2, R3 and R4 are positioned on the upper face of the bridge portion 800b and are arranged in a Wheatstone bridge configuration and electrically connected to the conditioning circuit 806 in known manner. Diaphragm 802 is a relatively thin rectangular plate and is secured to the underface 800d of the circuit board by an annular frit layer 810 and annular support member 804 is rectangular and is secured to the underface 802a of the diaphragm by an annular frit layer 812. A further annular frit layer 814 extends beneath bridge portion 800c to fixedly secure the bridge to the upper face 802b of the diaphragm.

It will be seen that bridge portion 800c flexes upwardly and downwardly with the diaphragm 802 so that the strain gauges R1, R2, R3 and R4 experience strain in proportion to the deflection of the diaphragm.

With respect to all of the embodiments shown in FIGS. 26-47, it will be understood that the diaphragm board assemblies disclosed in these embodiments would be used in association with housing assemblies of the type shown in the embodiments seen in FIGS. 1-25 with the board assemblies clamped at their ends and edges between upper and lower housings and with the housings coacting to define a pressure chamber in association with the strain gauge circuitry and a measurement chamber in association with the conditioning circuit.

The invention will be seen to provide a resistive strain gauge pressure sensor which is totally devoid of solder joints, thereby eliminating the expense of providing the solder joints and further eliminating the failure mode associated with failure of the solder joints in vibratory work environments.

Whereas preferred embodiments of the invention have been illustrated and described in detail it will be apparent that various changes may be made in the disclosed embodiments without departing from the spirit or scope of the invention.

I claim:

1. A pressure sensor including a diaphragm, circuitry on the diaphragm including a plurality of leads having free ends, and a circuit board mounting the diaphragm and including further circuitry including a corresponding plurality of leads having free ends, characterized in that the respective free ends of the diaphragm leads are electrically connected to the respective fee ends of the circuit board leads by a conductive paste material, the circuit board and the diaphragm are bonded together by a frit layer, and the electrical connection between the respective diaphragm lead free ends and the circuit board lead free ends is established through the frit layer.

2. A sensor according to claim 1 wherein the frit layer includes voids respectively associated with each diaphragm lead free end and the electrical connection between the respective diaphragm lead free ends and the circuit board lead free ends includes conductive paste material positioned in the voids.

3. A sensor according to claim 2 wherein the conductive paste material is a conductive epoxy material.

4. A resistive strain gauge pressure sensor including:
a circuit board;
circuitry on the circuit board including input and output terminals and a plurality of leads having free ends;
a diaphragm mounted on the circuit board;
strain gauge circuitry on the diaphragm including a plurality of strain gauges and a plurality of leads electrically interconnected to the strain gauges and having free ends; and
a conductive paste material electrically interconnecting each circuit board lead free end to the corresponding diaphragm lead free end;
the diaphragm being bonded to the circuit board by a frit layer;
the electrical interconnection of the circuit board lead free ends to the diaphragm lead free ends being established through the frit layer.

5. A sensor according to claim 4 wherein the frit layer includes a plurality of spaced voids respectively proximate each diaphragm lead free end and the conductive paste is positioned in the voids.

6. A pressure sensor including a diaphragm, circuitry on the diaphragm, and a circuit board mounting the diaphragm and including further circuitry for coaction with the strain gauge circuitry to perform the sensing function, characterized in that the diaphragm circuitry includes a plurality of leads having free ends, the further circuitry includes a corresponding plurality of leads having free ends, the diaphragm is bonded to the circuit board by a frit layer covering the diaphragm circuitry leads proximate their free ends and having spaced voids respectively exposing the free ends of the diaphragm circuitry leads, the free ends of the circuit board leads are respectively vertically aligned with the corresponding free ends of the diaphragm circuitry leads, and a conductive paste material is positioned in the voids in the frit layer and electrically interconnects each diaphragm circuitry lead free end with the corresponding circuit board lead free end.

7. A sensor according to claim 6 wherein the conductive paste material is a conductive epoxy material.

8. A sensor according to claim 6 wherein the sensor is a stain gauge sensor and the diaphragm circuitry includes a plurality of strain gauges electrically interconnected to the diaphragm circuitry leads.

* * * * *